Patented Mar. 23, 1937

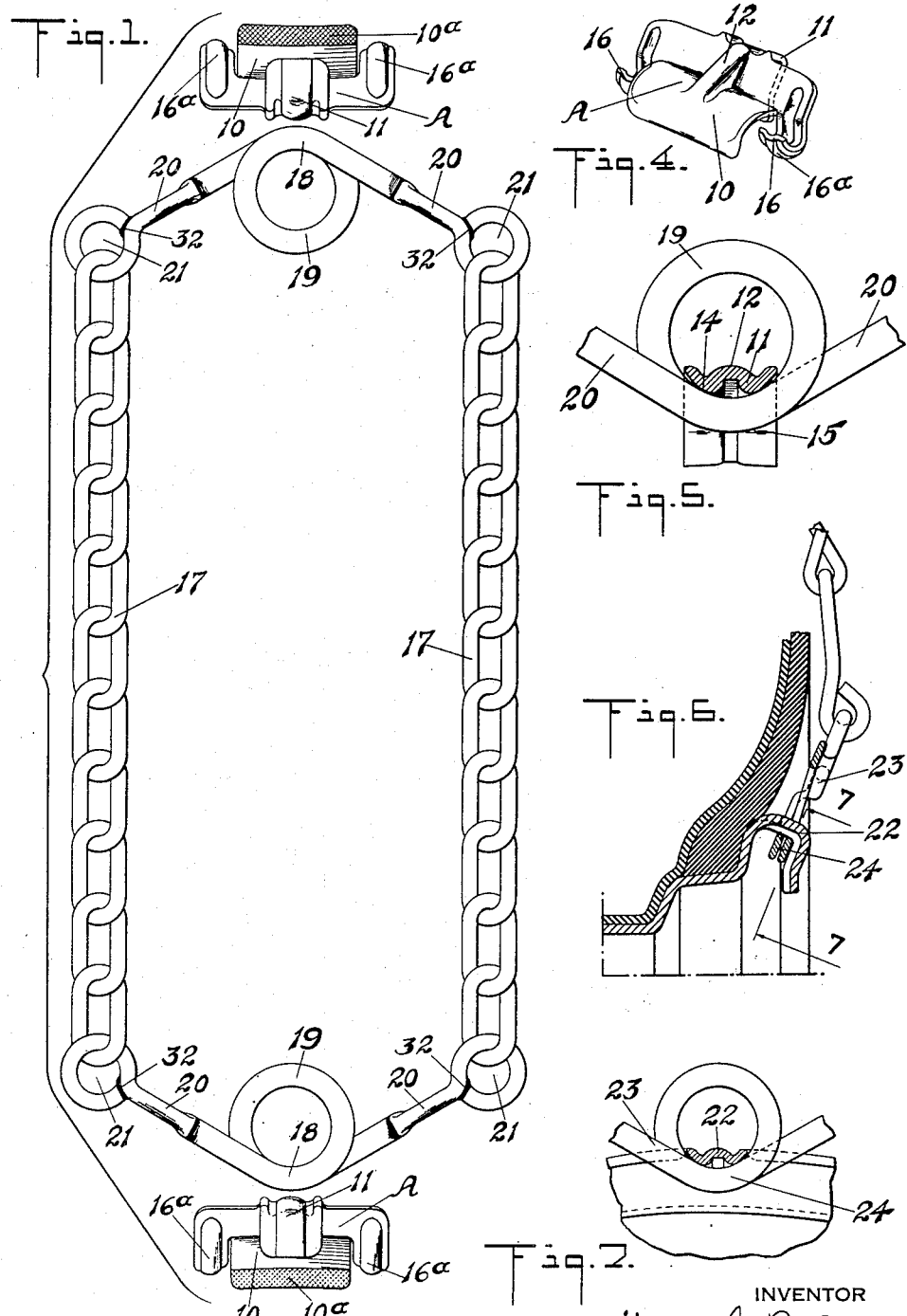

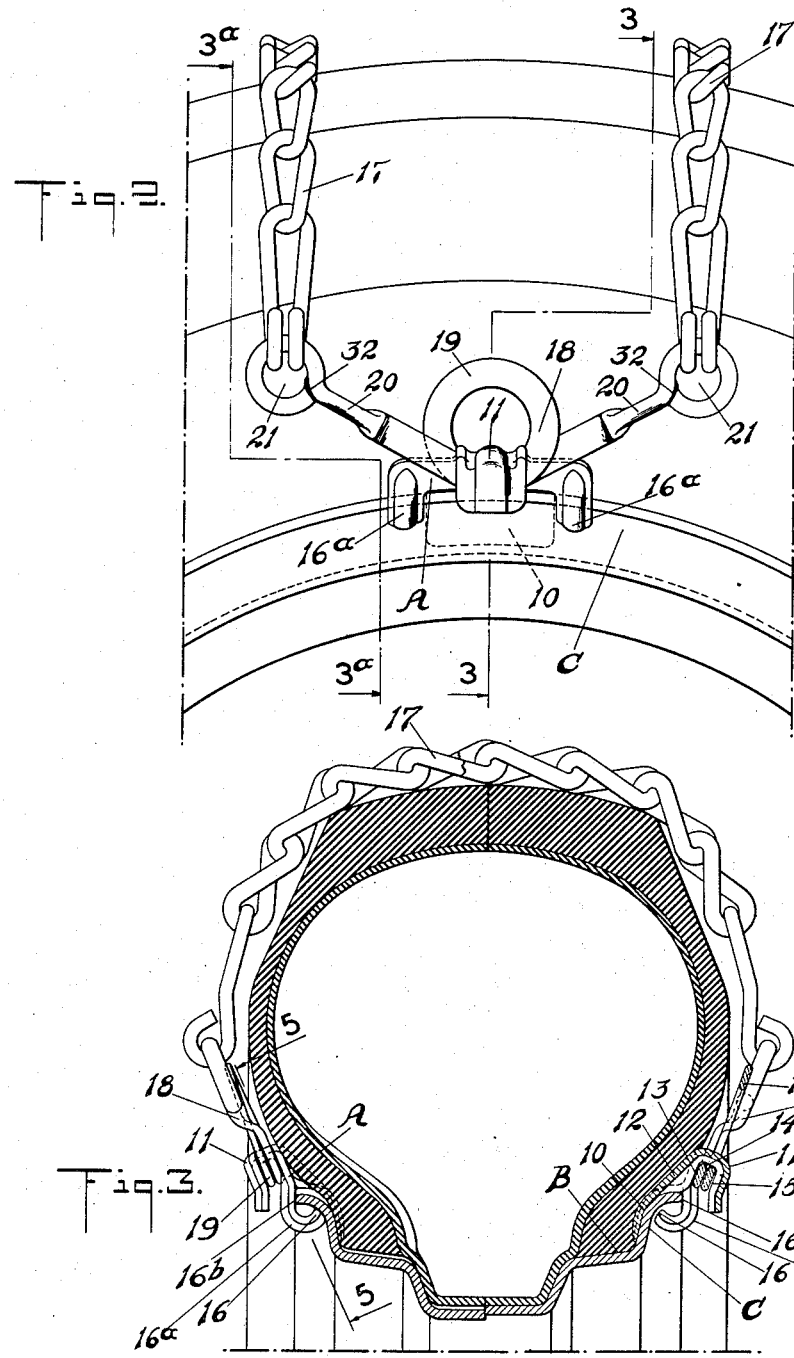

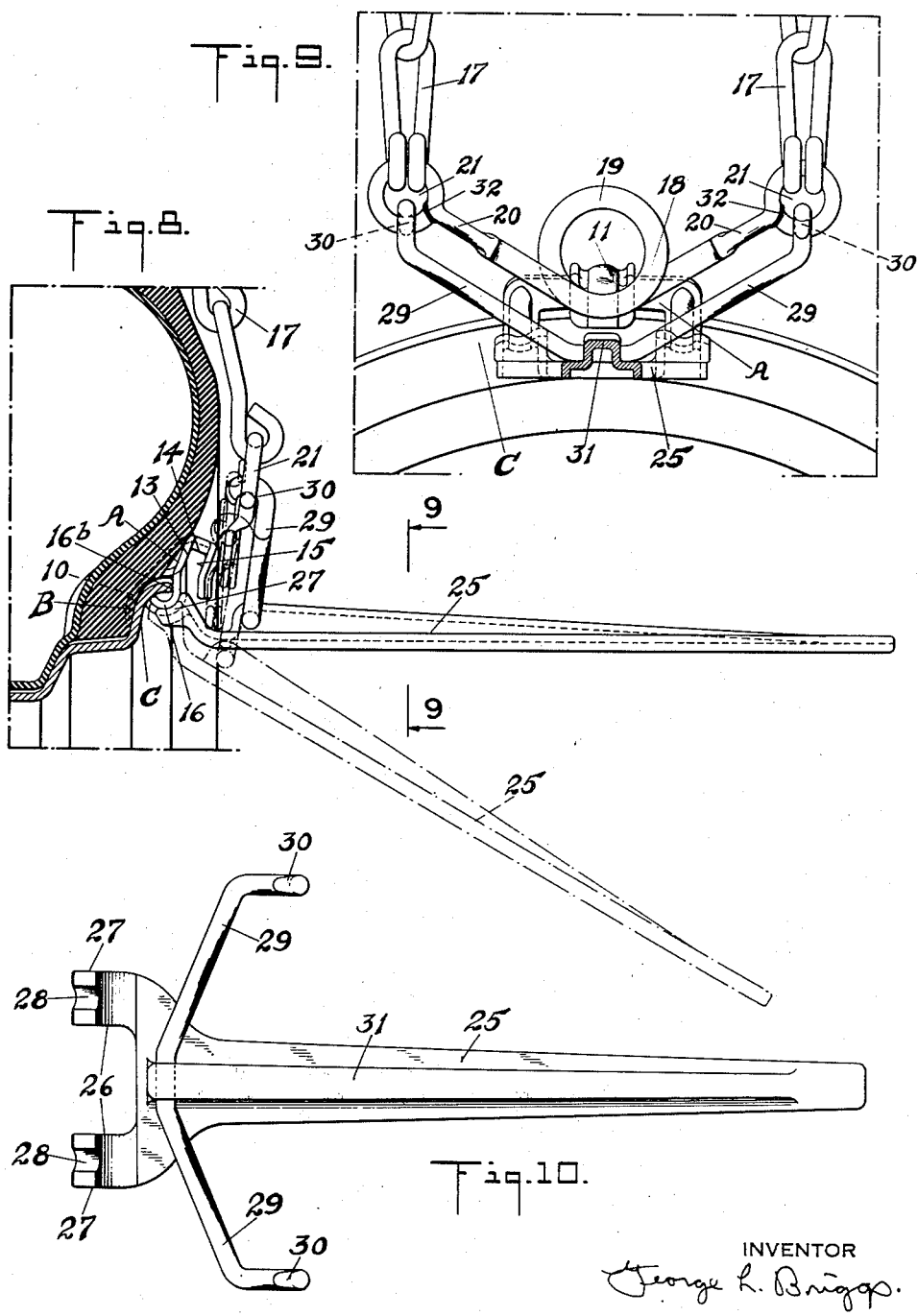

2,074,534

UNITED STATES PATENT OFFICE 2,074,534

SKID CHAIN

George L. Briggs, Oneida, N. Y.

Application July 30, 1936, Serial No. 93,359

9 Claims. (Cl. 152—14)

This invention relates to improvements in skid chains for automotive vehicles having resilient readily compressible tires, such as pneumatic tires.

The principal object of the invention is to provide a skid chain which can be readily attached to and detached from an automobile wheel having the usual standard rim, which will not chafe the sides of the tire, which will avoid sudden shocks to the chains, and which will transmit the pull of the chains to the rim itself instead of to the tires only.

With this general object in view, and some others which will be obvious from the description hereinafter, the invention broadly considered, comprises a pair of detachable hook-carrying members, one for each side of the wheel, each hook-carrying member having an inturned portion arranged to extend within the rim to engage the inner peripheral surface of said rim, the hook-carrying member also having a portion extending into contact with the outer peripheral surface of the rim and beneath the shoe of the tire, each hook-carrying member having a hook which may be engaged by a yoke device to which a plurality of chains are attached, each by one end, the opposite ends of said chains being connected to a similar yoke device which is engaged by the hook of the other hook-carrying member of the said pair, which is attached to the opposite side of the rim, each hook-carrying member being arranged to hold the central portion of its yoke device at an upward sloping angle to the vertical plane of the wheel so that the chains will be held away from the sides of the tire to an extent sufficient to allow the tire to expand laterally without restraint by the chains when the tire is compressed against the road, thereby avoiding chafing of the tire.

In the best embodiment of the invention, each yoke device is resilient so that it may yield to excessive pulls on the chains and thereby avoid sudden shocks on said chains.

The best embodiment of the invention, applicable to a standard rim having a drop center and carrying a tire having the usual straight side beads, will now be described in detail in connection with the accompanying drawings, in which Figure 1 is a plan view showing the cross chain and yokes with their retaining hooks;

Figure 2 is a side elevation, broken away, showing a cross chain in position upon the tire;

Figure 3 is a composite cross-sectional view of a tire and a rim, taken on the lines 3—3 and 3a—3a, showing their respective parts in section and in elevation;

Figure 4 is a perspective view of one of the hook-carrying means;

Figure 5 is a sectional view, broken away, taken on the line 5—5 of Figure 3;

Figure 6 is a sectional view, broken away, of a modification of the invention, showing the hook means formed upon the rim;

Figure 7 is a sectional view, broken away, taken on the line 7—7 of Figure 6;

Figure 8 is a sectional view of a tire and a rim showing the yoke-engaging means mounted as in applying a cross chain to a tire;

Figure 9 is a side elevation, broken away and partly in section, taken on the line 9—9 of Figure 8;

Figure 10 is a plan view of the tool for attaching the cross chains to the hook-carrying members.

Referring to the drawings, A is a hook-carrying member, advantageously formed from a plate of sheet steel and having means for engaging the outside peripheral surface B of the rim, this means, in the present example, consisting of a tongue 10 arranged to fit between the bead of the tire and the rim, this tongue being given any configuration necessary, both in a transverse and longitudinal direction, to have it match that external part of the rim upon which it is mounted, so that the tongue may be held firmly against the outside peripheral surface of the rim by the tire when the latter has been inflated. In the best embodiment of the invention the under side of this tongue adjacent the free end may be knurled, as at 10a, to increase the hold of the tongue on the outside surface of the rim. The hook-carrying member A also has a hook 11 whose walls extend upward as indicated at 13, outward as shown at 14, and downward as shown at 15, to provide a space within the hook to receive the loop or eye of the yoke device, the hook facing toward the center of the wheel when mounted thereon. It is to be noted that the walls 13 and 15 have flat inner plane faces parallel to each other, but not parallel to the plane of the face of the complete rim, the said inner faces of the hook sloping toward the plane of the face of the rim considered in the direction from the outside of the rim toward its center. The purpose of this slope will be explained hereinafter in connection with the description of the yoke device. For the purpose of giving transverse strength to the tongue 10 and hook 11, a rib is formed extending along these parts, as by pressing it up from the metal, as indicated at 12, Figures 3, 4.

The hook-carrying member is provided, also, with means for engaging the inner peripheral surface C of the rim. In the present example, this means comprises a plurality of claws 16, one at each side of the hook, these claws being formed to clear the edge of the rim, sufficiently to pass over a rolled edge, if the rim has such, and to extend in a direction to engage the inner peripheral surface of the rim, as will be clear from Figures 3, 8. In practice, the claws may be reinforced by ribs 16a, as shown in the drawings, in order to strengthen them.

The hook-carrying member A is put in place on a rim, when the tire is in a deflated condition, by first hooking the claws inside the rim, with the tongue 10 held up away from the outer peripheral surface of the rim. Then the tongue 10 is moved down into contact with the outer periphery of the rim until the inner faces of the claw shanks contact the face or edge of the rim, as at 16b, the shoe of the tire being pushed aside, if necessary, for that purpose and then brought back so as to rest upon the tongue. It will be seen in mounting the hook-carrying member A in this manner that the rim edge has been encompassed by the tongue and claws of the hook-carrying member, the claw shanks serving as a means to engage the edge of the rim and thereby determine the position of the tongue and the claws, proper, relative to the rim. Furthermore, the inner plane parallel faces of the hook will be made to assume a predetermined angular position with respect to the plane of the face of the rim upon which it is mounted. The mating hook-carrying member is attached in a similar way to the opposite face of the rim, at a point opposite the first one.

As is usual, more than one set of skid chains are to be applied, three sets being advisable, these being generally located about 120° apart on the wheel. The hook-carrying members for all sets desired are put in place while the tire is deflated. Then the tire is inflated, as usual, which results in holding the hook-carrying members firmly to the rim. It will be noted that where the tongue 10 of a hook-carrying member is provided with the rib portion 12, this rib is buried in the rubber of the shoe, which aids in preventing any shifting of the hook-carrying member along the periphery of the rim. At the same time the height of the rib 12 is not so great as to cause injury to the tire.

With the hook-carrying members in place, the vehicle may be operated without chains until such time as these are required.

Each of the set of skid chains comprises a plurality of chains 17, arranged to be placed transversely of the tread of the tire. In the example illustrated, two chains are employed in each set, the ends of these chains being secured to yoke devices 18. Each yoke device has an enlarged central portion arranged to fit into the hook 11 formed by the walls 13, 14, and 15 and has each of its ends connected to the corresponding end of the chain. In the present example, the yoke device comprises a metallic bar whose central portion is bent to form a central coil 19, into the opening of which the hook can enter, the depth of the hook space being greater than the radial width of the annular portion of the coil so that the central portion may have a limited range of movement in the direction of the length of the hook without being released therefrom. The thickness of the metal of the coil is such that it will fit into the hook but will be held by the walls 13 and 15 at an angle to the face of the rim. To insure this, it is important to make the coil with flat faces at each side, which can be done by flattening the coil. This also strengthens the coil in the direction of the pull on it. The yoke device has two arms 20, each extending in an opposite direction to the other from the coil 19, the free ends of these arms carrying eyes 21 to which the chains are connected. These arms, in the best embodiment of the invention, are offset from the coil so as to stand away from the side of the tire as shown in Figure 3. The eyes are larger than the diameter of the metal of a chain link, to provide for the insertion of a tool used in applying the chains to the hook-carrying members, as more fully explained hereinafter. The ends of the chains are connected to the respective eyes in any usual way. This may be done by using an open link at the end of the chain, inserting the link ends into the eye and then closing the open link, as shown in Figure 2. Instead of this the eyes on the ends of the yoke device may be first formed as open or slit eyes, while the chain link may be entire. The link may be slipped over the metal of the corresponding open eye, and the latter then closed to prevent withdrawal of the links. In the best embodiment of the invention, the eye is welded, as at 32, so that it cannot be pulled open.

As a set of skid chains has a yoke device at each end of the chains, the set may be put in place in its hook-carrying members by first inserting a yoke-device in the hook of one hook-carrying member, then placing the chains transversely across the tread of the tire, and finally inserting the second yoke-device in the hook of the coacting or mating hook-carrying device.

When the yoke devices are rigid, it is necessary to pull the chains down to compress the tire, in order to get slack enough to allow the central portion of the second yoke device to pass over the end of the hook of its coacting hook-carrying member after which it will enter the space between the walls 13 and 15 of the hook and be retained therein. However, to avoid the necessity for compressing the tire so much, it is advantageous to make the yoke devices resilient, as, for example, by forming the coil 19 and the arms 20, of spring steel of such dimensions that they will act as an elastic tensioning means between the chains and hooks. As will be clear from Figure 3, the enlarged central portion of the yoke device is held at an angle to the plane of the face of the rim by the walls of the hook which it engages, whereby the eyes of the yoke device and the chains will be held away from the sides of the tire, to an extent sufficient to allow the tire to expand laterally as it does when compressed by the roadway, thereby preventing unnecessary chafing or wear of the tire shoe on the chains due to this distortion of the tire. The elasticity of the yoke devices serves to maintain a tension on the hook, to prevent the central portion of the yoke device escaping from the hook. Furthermore, owing to the size of the hook and of the said central portion, the latter has to move a relatively considerable distance before it will disengage. When the chains are in place on a wheel and the wheel rotates, the skid device will be brought in contact with the roadway, and at that time will serve to increase the traction of the wheel, particularly if the roadway is icy or muddy, as the chains will bury themselves in the ice or mud and thus prevent the wheel from spinning. Any strain on one chain will not only be resisted by the elastic reaction of the yoke arm to which said chain is connected, but also will in part be transmitted to the companion chain, because the coil at the enlarged central portion which is engaged by the hooks will serve as a bearing in the hook for its yoke device and allow the same to swing angularly on such bearing, thereby pulling the other or companion chain more tightly against the tread of the tire. In practice, the hook has the inner surface of the wall 14 convexly curved transversely as shown in cross-section in Fig. 5, the curvature being of a smaller radius than the radius of the inside of the eye, thus allowing for a certain amount of tilting or swinging of its yoke device. Furthermore, this difference in curvature prevents clamping or seizing of the hook, in cases where the load, or pull, on the yoke device results in a contraction of the inside diameter of coil, and thereby always maintains a freely movable bearing. It will be noted that the hook-carrying member acts on the principal of a lever, the fulcrum of which is in the line of contact of the claws with the inside peripheral surface of the rim, the point of application of the power is at the hook, and the resistance may be considered as about at the inner end of the tongue. Since the leverage of the resistance is much greater than the leverage of the power the resistance necessary to overcome the power or pull on the hook is reduced materially. The upward pull of the chains and their yoke devices on the respective hooks falls but slightly outside the points of engagement of the claws with the inside periphery of the rim. Thus the claws transmit practically the entire pull of the chains to the rim.

Because of the greater leverage of the resistance, the tire, inflated against the tongue, is not called upon to any great extent to hold the hook-carrying members in place when the chains are in place. Of course, when the chains are removed, the tire serves to retain the said hook-carrying members against displacement, but at this time there is no load on them. If the tire at any time deflates while running, the hook member is free to swing about its fulcrum so that the hook can swing outward and then inward, the tongue shifting in a transverse direction from the outer periphery of the rim, thus avoiding further injury to the tire shoe, as would occur if the hook could not yield.

The yoke device has its arms extending from the central portion at an angle to each as shown in Fig. 1. This angle is such that the chains will be of the proper length to pass from one side of the wheel to the other side over the tread of the tire. It will be seen that the same length of chain may be used for tires of somewhat different diameters, by merely varying the said angle between the arms, which leads to some economy in manufacture, as it avoids the necessity of making different sized chains for the different sizes of tires within a certain range of tires.

While the best embodiment of the invention employs removable hook-carrying members, and elastic, or resilient, yoke devices and chains, some of the advantages of the invention may be obtained with non-removable hooks formed integral with the rim provided the hooks are properly formed and arranged. Such a modification is shown in Figs. 6 and 7. In this case the hook, 22, is integral with the rim, either because cut from the rim blank or by making the hook separately and welding it to the rim. In such a construction, the hook has its hook space somewhat wider than the central portion of the yoke device, 23, and is so arranged that the coil, 24, of the yoke device will contact with the edge of the rim at each side of the hook, thereby holding the eyes of the yoke device and the chains at a distance away from the sides of the tire. In this construction the central portion of the yoke device rests against one wall only of the hook, as will be clear from Fig. 6.

Means are provided for applying the yokes carrying the cross chains to the hooks upon the rim, these means consisting of a lever 25, having a fork at one end, this fork having branches 26 which are bent up at an angle to the longitudinal axis of the lever and have ends indicated at 27 arranged to ride on the surfaces of the claws. The ends 27 are provided with recesses, as indicated at 28, to receive the ribs 16a of the claws, thus properly positioning the tool on the claws. To the lever is journaled a yoke-engaging device having arms 29 extending at angles to each other, as shown in Figure 9, each arm having a hook 30 at its end arranged to enter the corresponding eye 21 in the yoke device.

In practice, the lever 25 is made from pressed sheet steel with a rib 31 along its upper surface, this rib being hollow, as shown in cross-section, Figure 9. Also the metal of the lever is flanged downward, as shown in cross-section, Figure 9, to strengthen the lever. The yoke-engaging device may be made from a round bar, and its central portion passes through the rib 31 of the lever 25 and is capable of angular motion with relation thereto.

To apply a set of emergency chains to a wheel having the above-described hook-carrying members upon the rims thereof, it is only necessary to place the central coil of one yoke device upon the hook member mounted upon the inside of the wheel, which can be done by extending one hand part way around the tire at the rear or forward part of the wheel, then while holding the said yoke device in place in said hook, grasp the other yoke device with the other hand and draw the cross chains transversely across the face of the tire until the coil of its yoke device lies adjacent the hook member mounted upon the outside of the wheel, then insert the hooks of the yoke-engaging device, Figures 8, 9, mounted upon the lever, into the respective eyes of the yoke device, place the recesses formed in the forked arms of the lever so as to engage the ribs formed upon the claws of the hook-carrying member, and exert a pressure upon the handle of the lever inward toward the center of the wheel. This pulls the yoke member and its central coil into a position, as best shown in broken lines, Figure 8, where the eye of the coil may be readily placed over the hook of the outer hook-carrying member. Then upon release of the pressure upon the lever handle the coil may be guided into its proper place between the inner parallel faces of the walls of the hook. To remove a set of chains from the wheel it will only be necessary to mount the tool as heretofore explained and reverse the process.

On account of the stresses thrown upon the eyes of a yoke device by the yoke-engaging device when mounting the chains, it is advantageous to have the eyes of the yoke members, solid, that is, without a slit. This can be done by welding the free end of each eye to its respective arm.

By the terms outer periphery of the rim or outer peripheral surface of the rim, mentioned herein, is meant that surface with which the tire contacts, irrespective of the convolutions of said surface, and by the terms inner periphery of the rim or inner peripheral surface of the rim is meant that surface of the rim to which the spokes of a wheel are attached.

What is claimed is:

1. In a skid chain device for automotive vehicle wheels, having compressible resilient tires, the combination, with a plurality of chains, and two yoke devices connected to the respective opposite ends of the chains, each yoke device having an enlarged central portion with flat sides, and two arms extending therefrom, the respective chains being connected to the ends of the corresponding arms of the yoke device, of a pair of hook-carrying members, each provided with a hook having a flat inclined inside wall arranged to engage a flat side of the central enlarged portion to hold the latter at an angle to keep the chains away from the corresponding side wall of the tire when the skid chain device is mounted on a wheel, said hook-carrying member comprising a part arranged to engage the inner peripheral surface of the rim, a part arranged to engage the outer peripheral surface of the rim and a part arranged to engage the edge of the rim to determine the positions of the other two parts relative to the rim, each hook facing toward the center of the wheel when mounted thereon.

2. In a skid chain device for automotive vehicle wheels, having compressible resilient tires, the combination, with a plurality of chains, and two yoke devices connected to the respective opposite ends of the chains, each yoke device having an enlarged central portion with flat sides, and two arms extending therefrom, the respective chains being connected to the ends of the corresponding arms of the yoke device, of a pair of hook-carrying members, each provided with a hook having two parallel flat inclined inside walls arranged to engage the corresponding flat sides of the central enlarged portion to hold the latter at an angle to keep the chains away from the corresponding side wall of the tire when the skid chain device is mounted on a wheel, said hook-carrying member comprising a part arranged to engage the inner peripheral surface of the rim, a part arranged to engage the outer peripheral surface of the rim and a part arranged to engage the edge of the rim to determine the positions of the other two parts relative to the rim, each hook being arranged to face toward the center of the wheel, when in place thereon.

3. In a skid chain device for automotive vehicle wheels having rims and compressible resilient tires, the combination, with a plurality of chains, and a pair of hooks respectively connected to opposite sides of the rim in line with each other and facing toward the center of the wheel, of a pair of yoke devices each having an enlarged central portion consisting of a coil and having two arms integral with the coil and extending therefrom at an obtuse angle to each other with the coil located within the outside angle near its vertex, each arm having its outer end connected to an end of the corresponding chain, said coil and arms being made of resilient material to hold the chains yieldingly, the coil of each yoke device being arranged to hook over and engage the corresponding hook carried by the rim, the arms of such yoke-device extending outward away from its hook, in the direction from the center of the wheel, whereby any stress of the chains on a yoke-device will tend to tighten up the coil and increase its reacting tension.

4. In a skid chain device for automotive vehicle wheels having rims and compressible resilient tires, the combination, with a plurality of chains arranged to cross the tread of the tire, and a pair of hooks respectively connected to opposite sides of the rim in line with each other, each hook being arranged to face toward the center of the wheel when in place thereon, each hook having an inner wall sloping outward from the plane of the corresponding face of the wheel in the direction away from the center of the wheel, of a pair of yoke devices, each having an enlarged central portion arranged to engage its respective hook and provided with a flat side arranged to bear against said inclined inner wall of its hook, each yoke device being provided with two arms extending from the enlarged central portion at an angle to each other to form an obtuse angle facing radially outward from the center of the wheel, the ends of said arms being connected to respective ends of the chains, the incline of the walls of each hook and the angular arrangement of the arms of its yoke being sufficient to hold the respective chains out of contact with the corresponding sides of the tire.

5. In a skid-chain device for automotive vehicle wheels having compressible resilient tires, the combination, with a pair of hook-carrying members, one for each side of the wheel, each of said members having one hook only, whose open end is arranged to face in the general direction of the center of the wheel, when said member is in place thereon, each member having two parts in fixed rigid relation to each other, one of said parts being arranged to engage the inner peripheral surface of the rim of the vehicle wheel, and the other part arranged to engage the outer peripheral surface of said rim, a pair of yoke devices, each having a central portion arranged to engage the hook of its respective hook-carrying member, said hook and said central portion being arranged when engaged to restrict transverse angular movement of the yoke-device inward toward the tire while permitting rocking movement of the yoke-device longitudinally, each yoke-device having arms extending in opposite directions from its central portion, and a plurality of skid-chains, each chain having one end connected to its respective arm of one yoke-device and having its other end connected to the corresponding arm of the companion yoke-device of the pair.

6. In a skid-chain device for automotive vehicle wheels having drop center rims and compressible resilient tires of the straight side bead type, the combination, with a plurality of chains arranged to cross the tread of the tire, and a pair of hooks rigidly connected to opposite sides of the rim in line with each other, each hook having an inner wall inclined to the plane of the corresponding face of the rim, the incline sloping inwardly of the rim in the direction of the center of the wheel, of a pair of resilient yoke devices connected to the respective opposite ends of the chains, each yoke device having an enlarged central portion, the outer surface of said enlarged central portion taking bearing upon the inner inclined surface of the hook and the inner surface of the yoke device taking bearing upon the edge of the rim adjacent each side of the hook when mounted thereon, each yoke device having means for maintaining the yoke device in a substantially central position with relation to its respective hook.

7. In a skid-chain device for automobile vehicle wheels having drop center rims and compressible resilient tires of the straight side bead type, in combination, with a plurality of chains arranged to cross the tread of the tire, a pair of hook-carrying members connected to opposite sides of the rim in line with each other, each hook-carrying member comprising a part arranged to engage the inner peripheral surface of the rim and another part to engage the outer peripheral surface of the rim, said parts being in permanently fixed rigid relation to each other and each hook-carrying member being provided with a hook having an inner surface inclined to the plane of the corresponding face of the rim when mounted thereon, of a pair of resilient yoke devices connected to the respective opposite ends of the chains, each yoke device having an enlarged central portion, the outer surface of said enlarged central portion taking bearing upon the inner inclined surface of the hook adjacent the lower edge of the enlarged central portion and the inner surface of the enlarged central portion taking bearing upon the wall of the hook-carrying member at a greater radial distance from the center of the wheel than the lower edge of the enlarged central portion.

8. In a skid-chain device for automobile vehicle wheels having drop center rims and compressible resilient tires of the straight side bead type, in combination, with a plurality of chains arranged to cross the tread of the tire, a pair of yoke devices connected to respective opposite ends of the chains, two rim and yoke engaging members detachably connected to opposite sides of the rim and in line with each other, each rim and yoke engaging member comprising a lever arm of effort extending outwardly of the plane of the edge of the rim and having formed upon its outer end a hook the open end of which faces inwardly toward the center of the wheel, another lever arm of resistance extending inwardly of the rim and engaging the outer peripheral surface of the rim, and a fulcrum part intermediate the other two parts arranged to engage the inner peripheral surface of the rim, all said parts being in permanently fixed rigid relation to each other and said hook engaging its respective yoke device.

9. In a skid-chain device for automotive vehicle wheels having compressible resilient tires, the combination, with a pair of detachable rim-engaging members, one for each side of the wheel, each member having two parts in fixed rigid relation to each other, one of said parts being arranged to engage the inner peripheral surface of the rim of the vehicle wheel, and the other part arranged to engage the outer peripheral surface of the rim, each member also having a holding device, and traction-increasing means arranged to extend transversely across the tread of the tire, when in place thereon, and connected to both holding devices.

GEORGE L. BRIGGS.